April 29, 1930. W. C. BLACK 1,756,450
CUTTER BAR FOR COAL CUTTING MACHINES AND THE LIKE
Filed Aug. 25, 1927
Fig. 1.
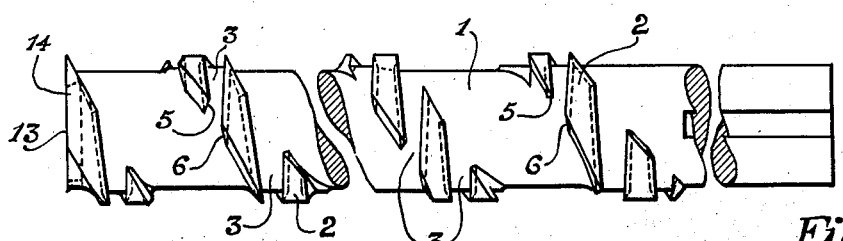
Fig. 2.
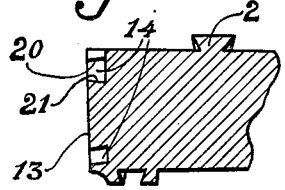
Fig. 3.
Fig. 10.
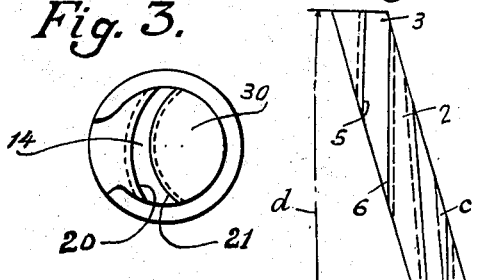
Fig. 4.
Fig. 7.
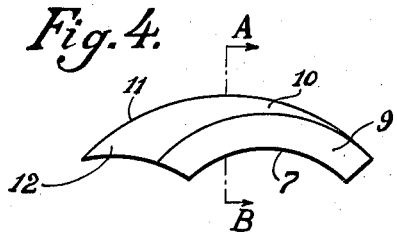
Fig. 6.
Fig. 8.
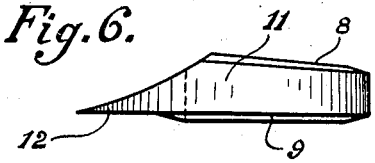
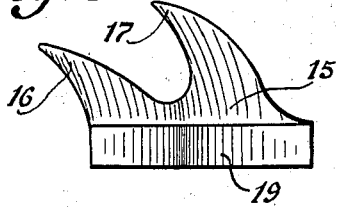
Fig. 5.
Fig. 9.
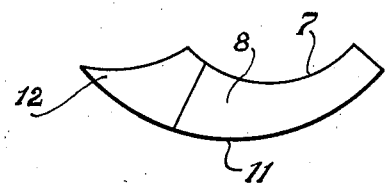
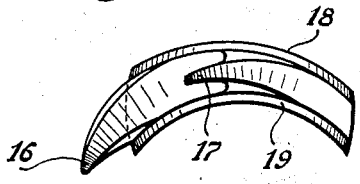
INVENTOR
WILLIAM CHRISTIE BLACK
BY
R. S. Waters
ATTORNEY Patented Apr. 29, 1930

1,756,450

UNITED STATES PATENT OFFICE

WILLIAM CHRISTIE BLACK, OF DUDLEY, ENGLAND, ASSIGNOR TO MATTHEW SMITH MOORE, OF BRUSSELS, BELGIUM

CUTTER BAR FOR COAL-CUTTING MACHINES AND THE LIKE

Application filed August 25, 1927, Serial No. 215,397, and in Belgium September 13, 1926.

This invention relates to cutter bars for coal cutting machines and the like, and it has for its object to provide a bar that will have greater strength than the cutter bars of current design, in addition to being more cheaply manufactured and proving more reliable in retaining the picks for cutting the coal or other minerals.

In the usual coal cutting machines of the bar type the cutter bars are in the shape of threaded rods having radial holes drilled therein and the cutter picks are provided with stems adapted to be inserted and keyed in position in said holes. It has also been proposed to cut across the thread a number of flat bottomed dovetailed slots for receiving cutter picks having a flat wedge-shaped base adapted to fit in such slots. In structures of the first type the cutter picks are liable to break at the junction of the stem with the outwardly projecting portion of the pick; moreover the contacting surfaces of the keys and keyways wear rapidly with the result that the picks are liable to turn in their seats. In structures of the second type referred to the slots or wedge-shaped seats for the cutter picks must be tangential to the body of the bar in order not unduly to weaken the same, with the result that the picks project radially to a considerable distance and in use they make in the coal or other material a cut of excessive thickness. Then also both structures require very costly machining, whether it be for drilling the holes and cutting the keyways, or for dressing the straight faces of the dovetailed slots.

These various inconveniences are obviated by the present invention. To this end I also secure the cutter picks in dovetailed slots in the bar but in accordance with my invention these slots have arcuate surfaces adapted to be turned on a lathe, and in these slots are engaged correspondingly curved surfaces on the base of the picks. The side faces of the slots are formed by cutting the thread at two different angles in order to produce the taper required to retain the picks in position; the machining of the bar to provide the thread and the slots therein can be completed in one setting on the lathe. By slightly altering the position of the bar in the lathe for each slot or group of slots in alignment, the bottom face of the slots can be formed eccentric to the bar so that three tapering surfaces are provided to retain the cutter pick.

Owing to the arcuate shape of the slots a longer and firmer support of the cutter picks is afforded than with a straight cut across the thread. The slots may be placed very close to each other, say at an average distance equal to the mean width of said slots. In this case when a double threaded bar is used the picks on the two threads may be alternated so that they will cut the material along a practically continuous line, and reciprocating motion of the bar may be dispensed with. This arrangement is suitable for various applications other than coal cutting, as for example for tree felling.

The cutter picks with a curved base may be made by stamping at red heat, and finished off on the lathe if desired. The cutting edge of each preferably projects forwardly of the base and ends in a point the direction of which is substantially tangential to the under face of the base. With this arrangement the cutting edge may repeatedly be subjected to grinding before the pick has to be discarded. It should also be mentioned that in use the picks form on the cutter bar projections of comparatively small size, whereby the thickness of the cut and the attendant waste is reduced.

The curved slot arrangement according to the invention can also be used with advantage for securing the cutter pick usually fitted at the outer end of the cutter bar. In this case the bottom of the groove is flat and its converging side walls are of arcuate shape, the taper running in opposite direction to the direction of rotation of the bar. I am thus enabled to avoid the use of cotter pins and the drilling of the bar which impairs its resistance and increases the cost of manufacture.

In the accompanying drawings I have diagrammatically illustrated, by way of example, a cutter bar according to my invention.

Fig. 1 is a side view of the bar showing the arrangement of the curved slots.

Figs. 2 and 3 show the outer end of the bar in axial section and end view respectively.

Figs. 4, 5 and 6 are respectively two side views and a top view of a cutter pick and Fig. 7 is a cross-section on line A—B of Fig. 4.

Figs. 8 and 9 are a side view and a top view respectively of an end pick.

Fig. 10 shows on a larger scale a development of the thread on the bar.

The bar 1 herein shown is provided with a right handed screw 2 through which are cut the dovetailed slots or seats 3 for the cutter picks 4. The thread being cut to the desired pitch by the usual screw cutting means, the slots 3 are opened up by cutting to a shorter pitch, in direction of line $a$ (Fig. 10). To obtain the necessary taper an additional cut is made in each slot in the direction of line $b$, at right angles to the axis of the bar, thus removing the metal over the shaded areas $c$. In each slot both side walls 5, 6 are undercut to give the desired dovetail grip. In Fig. 10 the distance $d$ corresponds to the development of half the circumference of the thread.

In these slots 3 are fitted the picks 4 (Figs. 4 to 7) with their curved bases having arcuate faces 7, 8, 9 respectively corresponding to the bottom face and side faces 5 and 6 of the slots. The side face 8 of each pick may extend over the whole depth thereof but the opposite face 9 preferably merges into a face 10 at right angles to the axis of curvature of the other faces so as to strengthen the top portion 11 of the pick. The point 12 of the pick projects forwardly of the base and extends in a direction substantially tangential to the bottom face 7.

In the end face 13 of the bar is cut the curved slot 14 for accommodating the end pick 15 which, in the example illustrated, is provided with two points 16, 17. The side walls 18, 19 of the base of this pick respectively correspond to the undercut side walls 20, 21 of the slot 14.

As shown in the drawing all the curved slots are tapered in opposite direction to the direction of rotation of the bar so that the grip on the cutter picks increases with the resistance to their rotation. It will also be seen that with their curved base the picks find in the slots a support of great length in comparison to their size and more particularly in comparison to their radial dimensions, and that the construction described offers the various advantages above set forth. It will further be understood that the shape of the cutter bar and picks described with reference to the accompanying drawings may be varied without departing from the scope of this invention.

I claim:

1. A cutter bar comprising a threaded rod having a dovetailed tapering slot cut through its thread, a wall of said slot being helical in shape.

2. A cutter bar comprising a threaded rod having dovetailed tapering slots cut through its thread, said slots having a longitudinally cylindrical bottom wall.

3. A cutter bar comprising a threaded rod having arcuate tapering slots cut through its thread, the bottom walls of said slots being concentric to the longitudinal axis of said rod.

4. A cutter bar comprising a threaded rod having dove-tailed tapering slots cut through its thread, one of the side walls of said slots being cut at right angles to the axis of the bar, the slots having longitudinally cylindrical bottom walls.

5. A cutter bar comprising a threaded rod having an arcuate tapering slot cut across one of its end faces, said slot having its side wall undercut.

6. A cutter bar comprising a threaded rod having a tapering slot cut across one of its end faces said slot having a flat, arcuate bottom wall and longitudinally cylindrical side walls, the side walls being undercut.

7. A cutter bar comprising a threaded rod having an arcuate tapering slot cut through its thread, and an arcuate tapering slot cut across one of its end faces, the slot through the thread having a longitudinally cylindrical bottom wall, the slot across an end face having undercut side walls.

8. A cutter pick comprising a tapered base having a longitudinally cylindrical bottom wall and side walls flaring outwardly and downwardly, and a top portion having a cutting point projecting in front of said base.

9. The combination of a cutter bar comprising a threaded rod having slots with longitudinally cylindrical bottom walls cut through its thread, and cutter picks having longitudinally cylindrical bases adapted to fit in said slots.

10. A cutter bar comprising a threaded rod having tapering slots cut through its thread, said slots having longitudinally cylindrical and transversely flat bottom walls, and undercut side walls.

WILLIAM CHRISTIE BLACK.